(12) United States Patent
Kheyfets

(10) Patent No.: US 8,620,887 B2
(45) Date of Patent: Dec. 31, 2013

(54) OPTIMIZATION OF OUTPUT DATA ASSOCIATED WITH A POPULATION

(75) Inventor: Boris L. Kheyfets, Philadelphia, PA (US)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 13/037,859

(22) Filed: Mar. 1, 2011

(65) Prior Publication Data
US 2012/0226690 A1    Sep. 6, 2012

(51) Int. Cl.
*G06F 7/00*    (2006.01)

(52) U.S. Cl.
USPC .......................................... 707/702; 707/601

(58) Field of Classification Search
USPC .................. 707/713, 702, 601, 968–974; 716/122–125, 130–132; 705/14.35, 705/14.43
See application file for complete search history.

(56) References Cited

U.S. PATENT DOCUMENTS

| | | | |
|---|---|---|---|
| 6,907,566 B1 * | 6/2005 | McElfresh et al. | 715/210 |
| 7,533,038 B2 * | 5/2009 | Blume et al. | 705/7.31 |
| 7,809,659 B1 * | 10/2010 | Paiz | 706/20 |
| 8,010,387 B2 * | 8/2011 | Porter et al. | 705/4 |
| 2003/0187717 A1 | 10/2003 | Crites et al. | |
| 2004/0093296 A1 | 5/2004 | Phelan et al. | |
| 2005/0071223 A1 | 3/2005 | Jain et al. | |
| 2007/0053513 A1 * | 3/2007 | Hoffberg | 380/201 |
| 2007/0087756 A1 * | 4/2007 | Hoffberg | 455/450 |
| 2008/0065471 A1 * | 3/2008 | Reynolds et al. | 705/10 |
| 2008/0097842 A1 * | 4/2008 | Tirumala et al. | 705/14 |
| 2008/0097843 A1 * | 4/2008 | Menon et al. | 705/14 |
| 2008/0249837 A1 | 10/2008 | Angell et al. | |
| 2008/0249858 A1 | 10/2008 | Angell et al. | |

* cited by examiner

*Primary Examiner* — James Trujillo
*Assistant Examiner* — Linh Black
(74) *Attorney, Agent, or Firm* — Michael A. Springs; Moore & Van Allen, PLLC; Sreenivas Vedantam

(57) ABSTRACT

Embodiments of the present invention relate to systems, methods and computer program products for allowing a user to define output data to be optimized for a population, define one or more input constraints based on which the output data is to be optimized, and optimizing the output data for the population by selecting an object based on a selection routine. Embodiments of the present invention allow fast and accurate optimization of output data associated with large populations.

41 Claims, 7 Drawing Sheets

OPTIMIZATION OF OUTPUT DATA ASSOCIATED WITH A POPULATION

BACKGROUND

The process of optimizing output data is an important process for any entity. For instance, an entity such as a business entity, organization, or the like would like to maximize the revenue that it earns on a product line, the profit that it earns on a product line, the number of products that it sells, etc. Alternatively, the entity may want to minimize the costs associated with selling products on a product line, minimize the number of employees working in a department of the entity, minimize the overhead associated with a particular product line, etc. In order to achieve each of these objectives, the entity may design one or more optimization functions.

A maximizing or minimizing objective function is subject to one or more constraints. For instance, the constraints imposed on the goal of maximizing revenue on a product line may be a limited budget, a limited number of sales channels, a limited time period for selling the product, etc.

An objective function depends on unknown variables whose values need to be determined in order to solve an optimization problem. In general, an optimization problem is an objective function that is subject to one or more input constraints. One type of an optimization problem is a binary programming (BP) problem. A BP problem is an instance where unknown variables of an objective function can take values of either 0 or 1. In general, BP problems are part of the class of IP (integer programming) problems. An IP problem is an instance where unknown variables of an optimization problem take integer values. When the population dataset is sufficiently large, the BP problem is an ELSBP (extra-large scale binary programming) problem which is part of the class of ELSIP (extra-large scale integer programming) problems.

In general, IP problems are NP-hard (non-deterministic polynomial-time hard) problems. In computational complexity theory, these problems are at least as hard as the hardest problems in NP. A problem 'H' is NP-hard if and only if there is an NP-complete problem 'L' that is polynomial time Turing-reducible to 'H.' A problem 'L' is NP-complete if it has two properties: (1) it is in the set of NP (nondeterministic polynomial time) problems, i.e., any given solution to 'L' can be verified quickly (in polynomial time); and (2) it is also in the set of NP-hard problems, i.e., any NP problem can be converted into 'L' by a transformation of the inputs in polynomial time.

Current optimization systems do not have the ability to efficiently optimize output data associated with a population greater than 50,000 objects. Therefore, there is a need for a system that has the ability to optimize output data associated with populations greater or much greater than 50,000, such as a population of 10,000,000 or greater.

Current optimization systems or solver systems do not have the capacity to produce output data in a short period of time when the size or volume of the population becomes too large. Therefore, there is a need for a system that runs faster and has the ability to produce accurate output data associated with a large population in a short period of time.

Current optimization systems are also cumbersome to use. Therefore, there is a need for a system that is easier to use, i.e., more user-friendly. For instance, there is a need for a system that allows a user to more easily define or modify an optimization problem, allows a user to change input constraints upon which the optimization problem is solved, allows a user to define a range for each input constraint, allows a user to view output data from a plurality of output scenarios, etc.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing apparatuses (e.g., a system, computer program product, and/or other device), methods, or a combination of the foregoing for optimizing output data associated with a population based on one or more input constraints.

For example, some embodiments of the invention provide a method for optimizing output data for a population. The method includes allowing a user to define one or more output data for optimization, allowing a user to define one or more input constraints based on which the output data is to be optimized, and optimizing the output data for the population, subject to the input constraints, by selecting an object of the population based on a selection routine. In some embodiments, the population may be very large, e.g., 10,000,000 objects.

Other embodiments provide an alternative method for optimizing output data for a population. The method includes allowing a user to define one or more output data for optimization, allowing a user to define one or more input constraints based on which the output data is to be optimized, and optimizing the output data for the population, subject to the input constraints, by selecting an object of the population based on a selection routine. In this embodiment, the input constraints include a maximum risk factor associated with an object of the population, a minimum probability factor associated with an object of the population opening an account, a maximum cost factor associated with communicating to an object of the population an offer to open an account, etc.

Other embodiments provide an alternative method for optimizing output data for a population. The method includes allowing a user to define one or more output data for optimization, allowing a user to define one or more input constraints based on which the output data for the population is to be optimized, and optimizing the output data for the population, subject to the input constraints, by: partitioning the population into a first number of partitions, and optimizing output data for each partition by: selecting an object from each partition based on a first selection routine, and generating optimized output data for the population. In some embodiments of the method, the first selection routine comprises sorting each partition based at least in part on one or more parameters associated with objects in each partition. Additionally, the population is partitioned in a manner such that objects in each partition are similar.

In some embodiments, the method further includes partitioning the population into a second number of partitions, and optimizing output data for each partition by: selecting an object from each partition based on a second selection routine, wherein the second number of partitions is greater than the first number of partitions. In some embodiments of the method, the second selection routine comprises sorting each partition based at least in part on one or more parameters associated with objects in each partition, and based at least in part on the optimized output data for the population. Additionally, the population is partitioned in such a manner that objects in each partition are similar.

Additionally, in some embodiments, the output data for the population is defined as a function that comprises at least one variable. Here, the value of the variable is '1' for a selected object, and the value of the variable is '0' for an unselected object.

Additionally, in some embodiments, the output data for a partition is defined as a function that comprises at least one variable. Here, the value of the variable is greater than '0' but less than or equal to '1' for a selected partition, and the value of the variable is '0' for an unselected partition. The variable represents a portion of the partition to be selected.

In some embodiments, a selected object is an individual, entity, or the like who receives an offer to open an account at a financial institution. The selected object receives the offer via one or more communication methods, wherein the communication methods may be pre-specified by the selected objects. In some embodiments, the output data is the income collected from accounts opened by one or more selected objects.

In some embodiments, the population comprises at least 50,000 objects. In other embodiments, the population comprises at least 10,000,000 objects.

In some embodiments, the method further includes producing, via a computing device processor, a communication file comprising communication details for the selected objects.

Each of the above embodiments of the method is executed via a computing device processor.

Embodiments of the invention also provide an apparatus for optimizing output data associated with a population. The apparatus includes a computing platform including at least one processor and a memory. The apparatus also includes a module, or more than one module, stored in the memory, executable by the processor, and configured to execute the various embodiments of the method described above.

Embodiments of the invention also provide a computer program product for optimizing output data associated with a population. The computer program product includes a non-transitory computer-readable medium including a set of codes for causing a computer to execute the various embodiments of the method described above.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
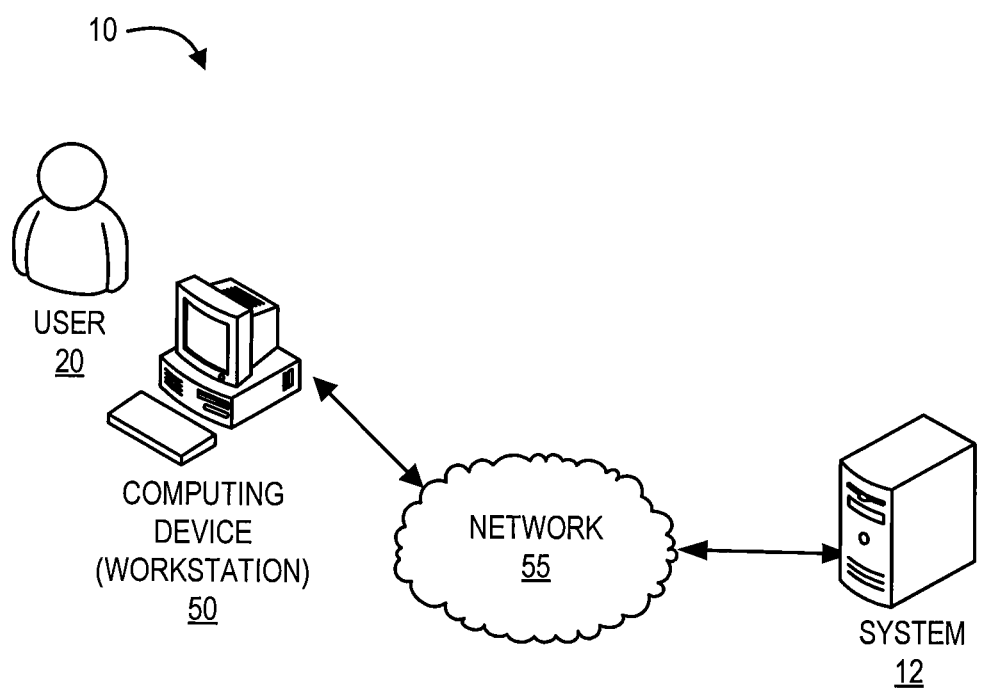
Figure 2:
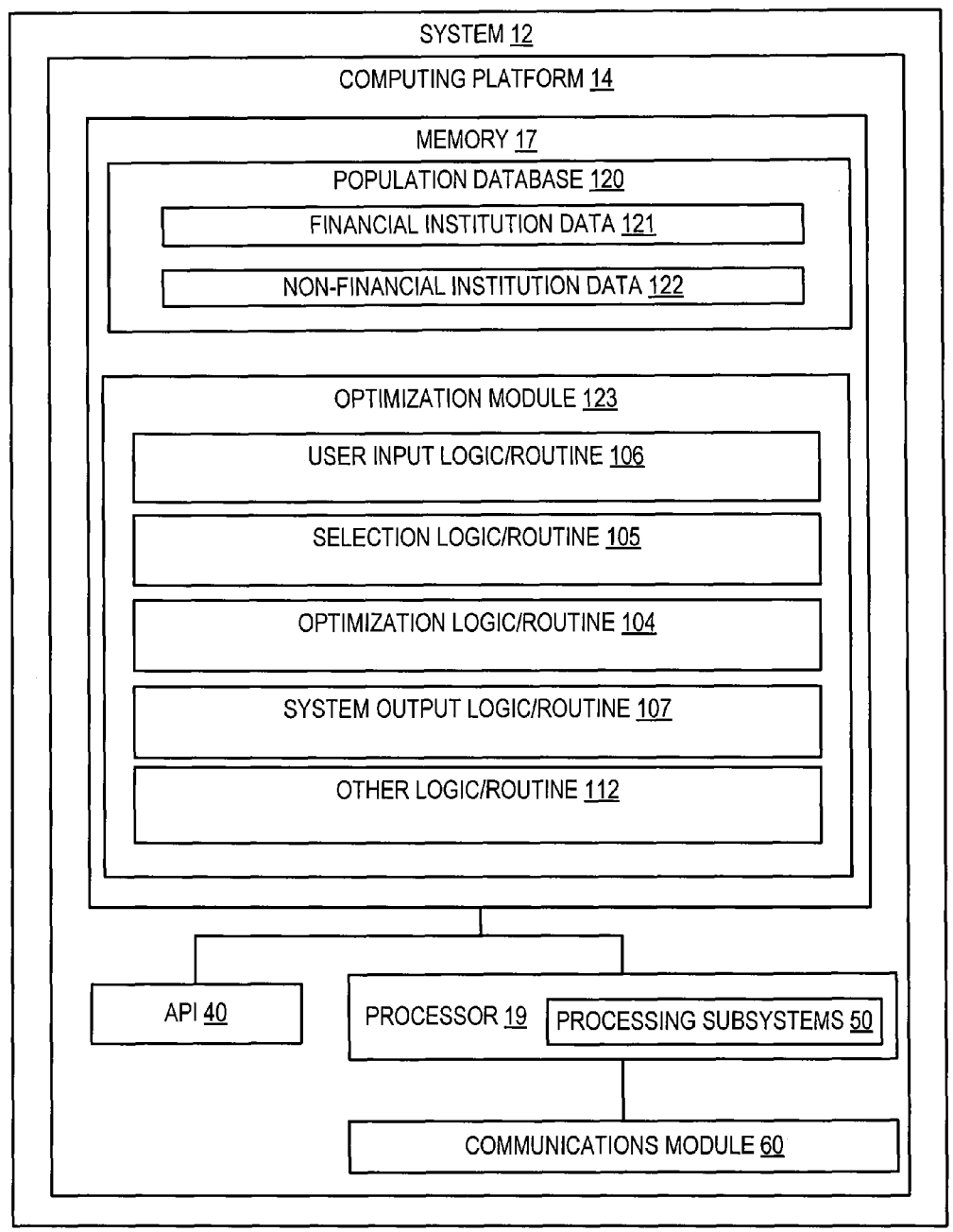
Figure 3:
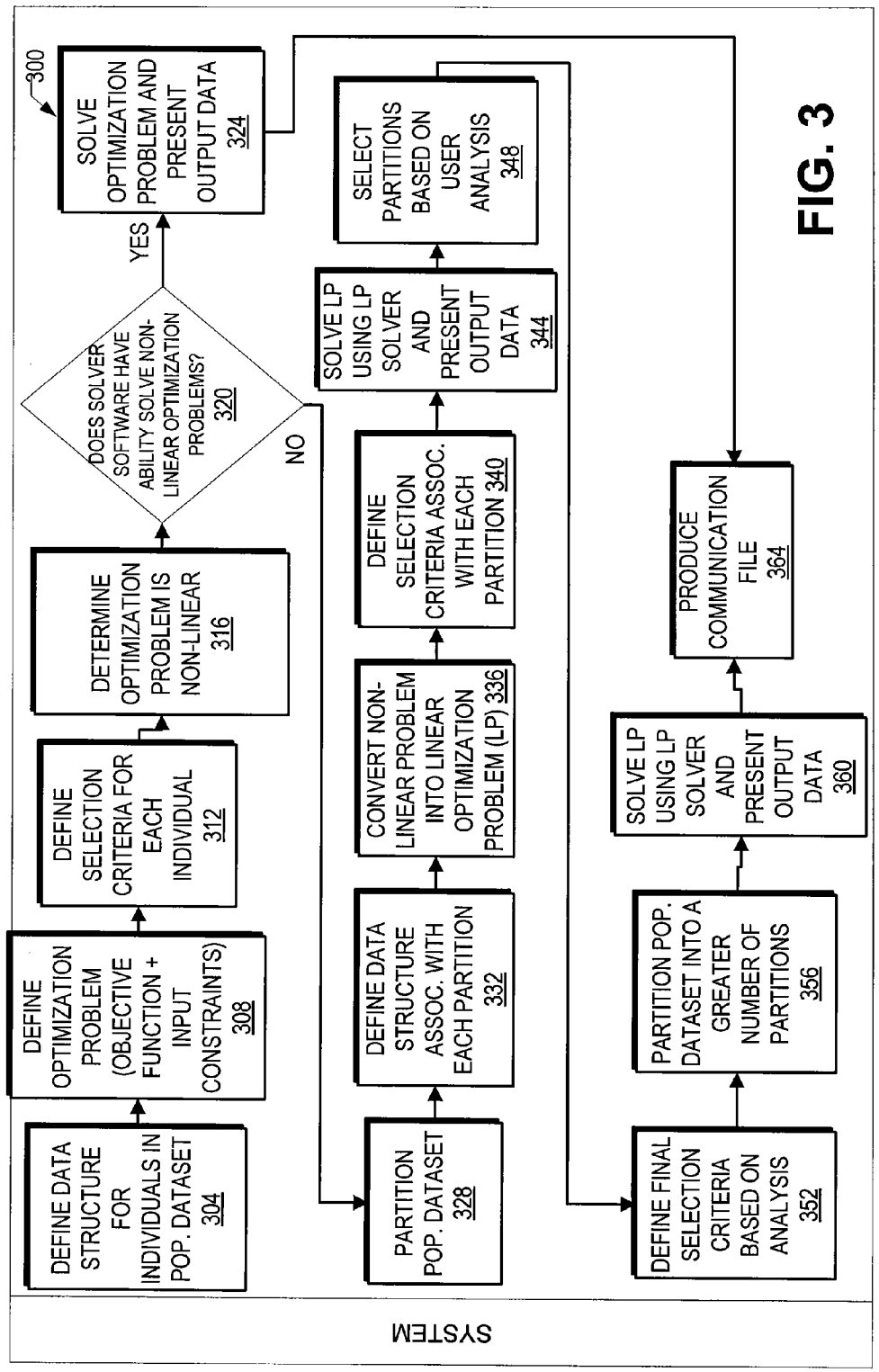
Figure 4:
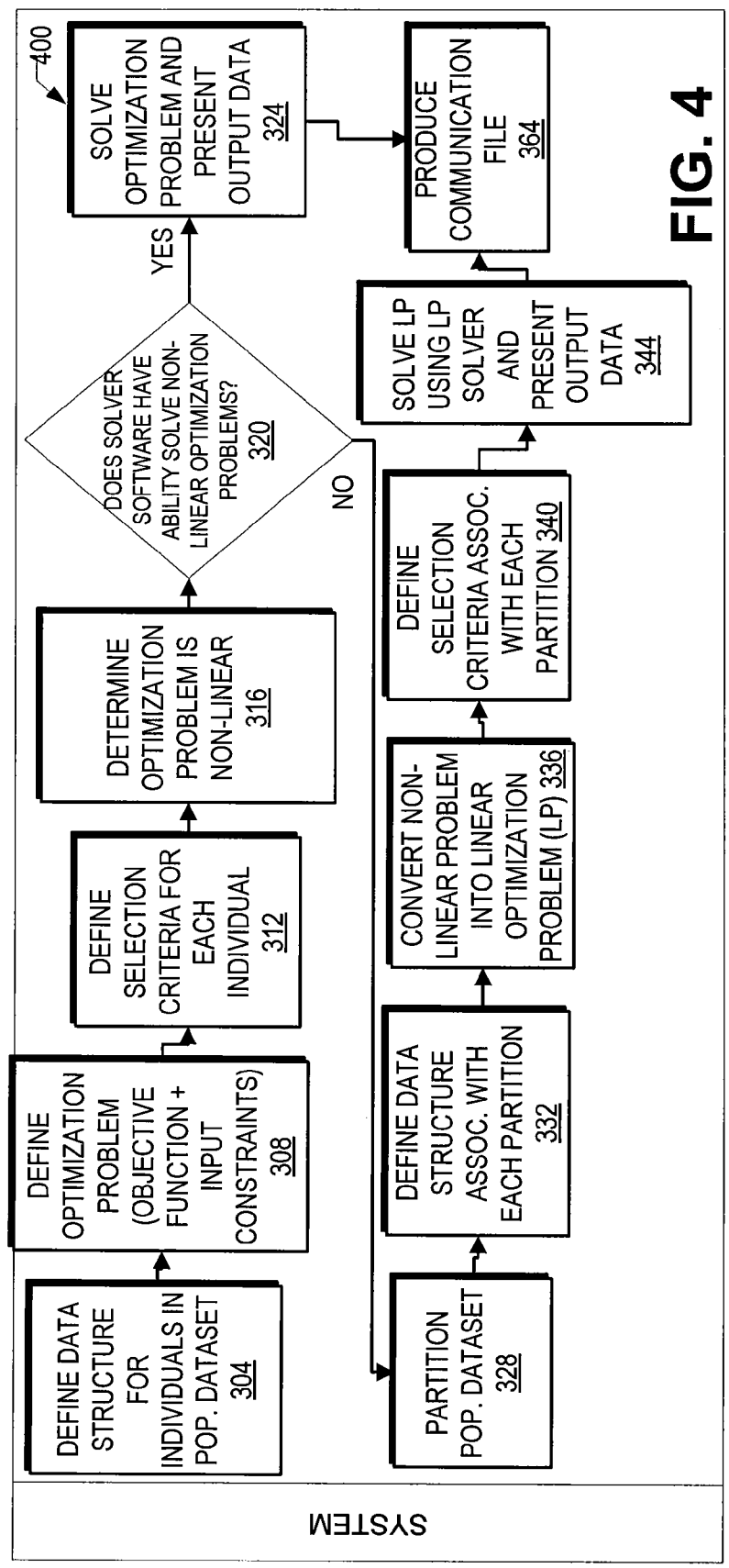
Figure 5:
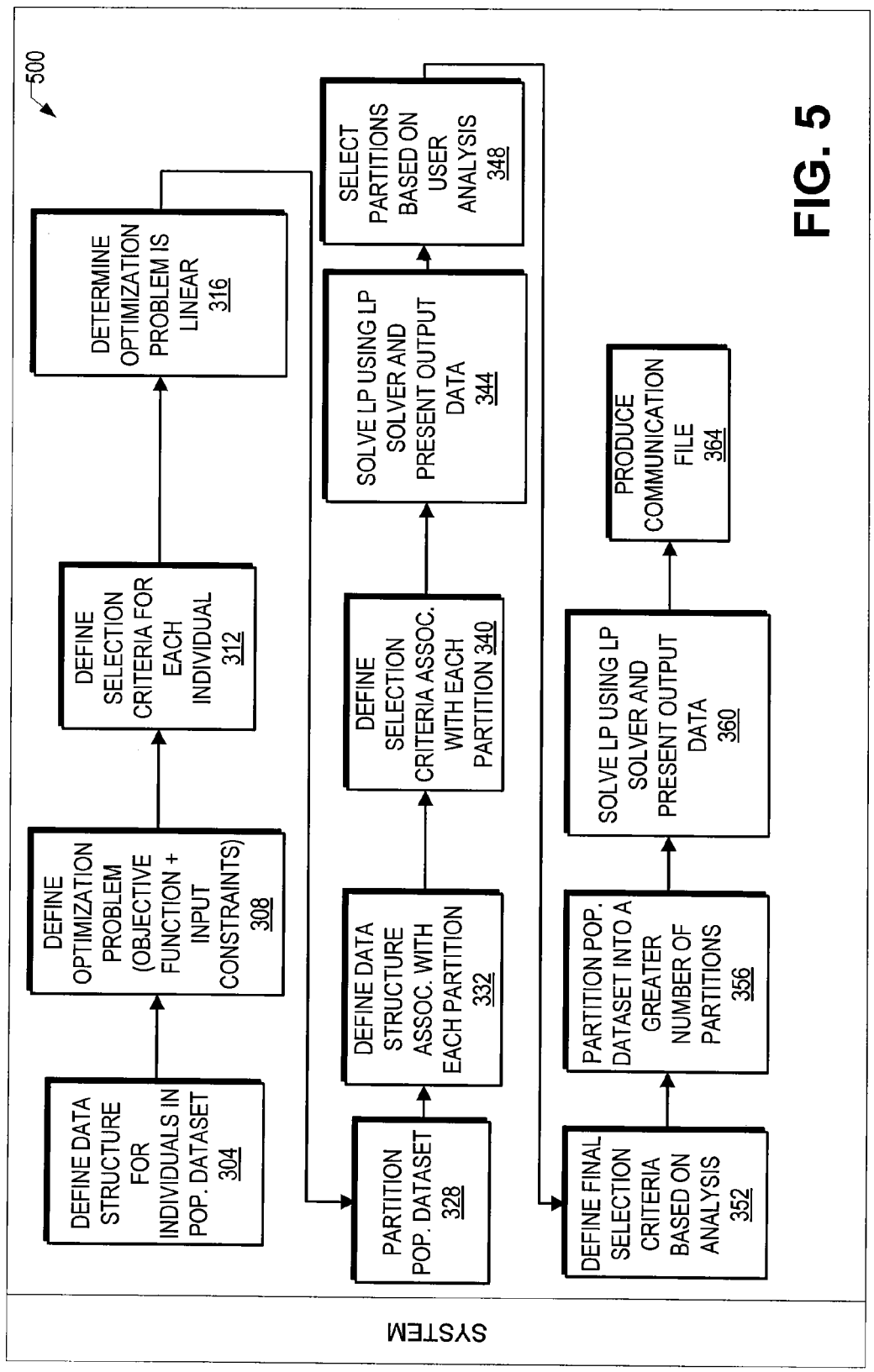
Figure 6:
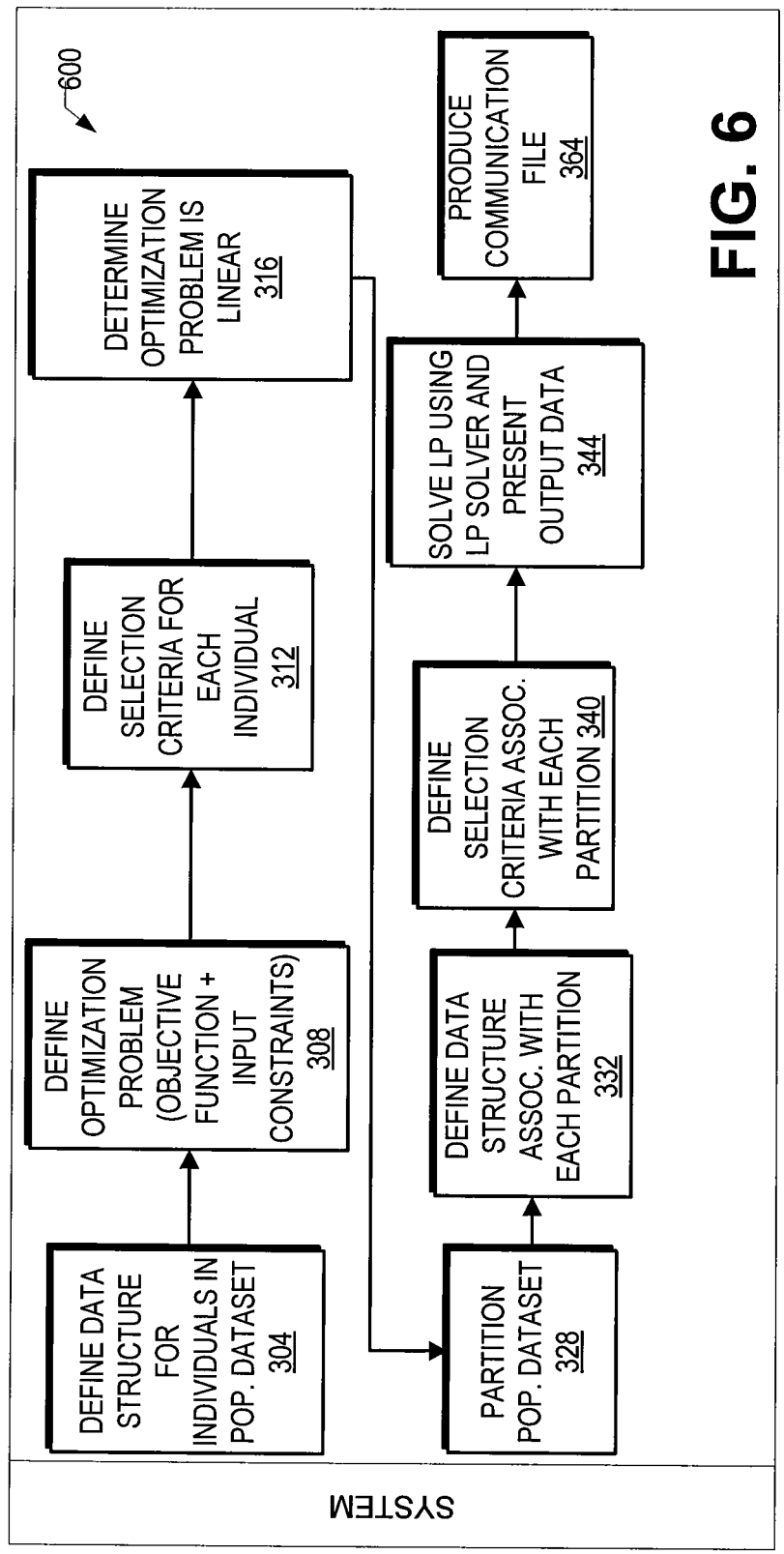
Figure 7:
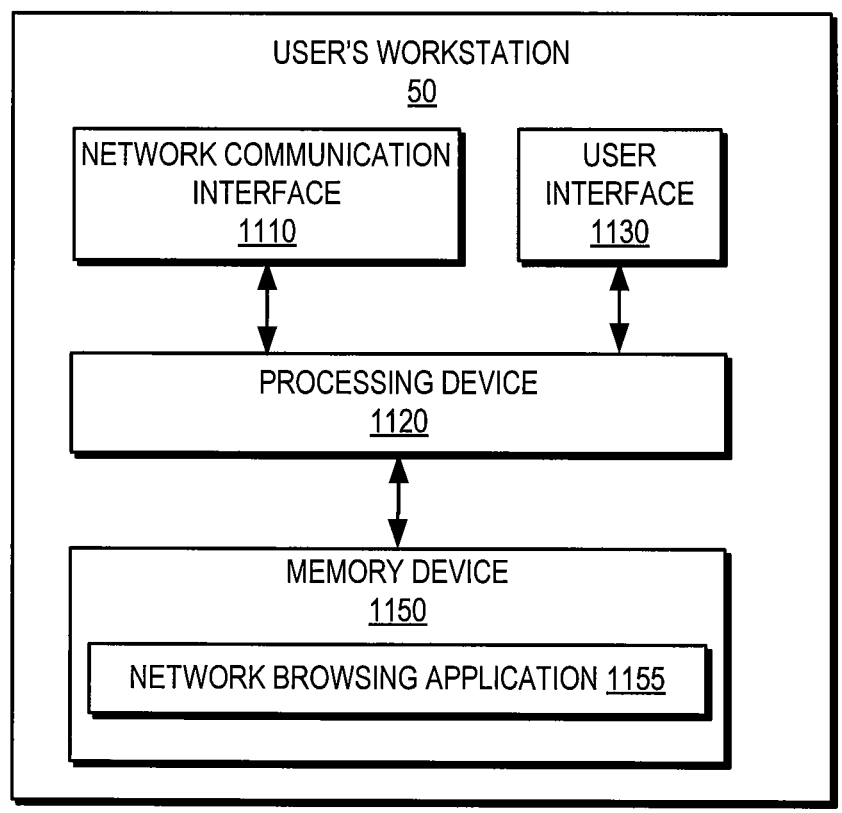

Having thus described embodiments of the invention in general terms, reference will now be made to the accompanying drawings, wherein:

FIG. 1 is a block diagram illustrating a computer network environment, in accordance with embodiments of the present invention;

FIG. 2 is a block diagram of a system for optimizing output data associated with a population based on one or more input constraints, in accordance with embodiments of the present invention;

FIG. 3 is a flowchart for optimizing output data associated with a population based on one or more input constraints, in accordance with embodiments of the present invention (non-linear optimization problem converted to a linear optimization problem with multiple iterations of partitioning a population dataset); and FIG. 4 is another flowchart for optimizing output data associated with a population based on one or more input constraints, in accordance with alternative embodiments of the present invention (non-linear optimization problem converted to a linear optimization problem with a single iteration of partitioning a population dataset);

FIG. 5 is another flowchart for optimizing output data associated with a population based on one or more input constraints, in accordance with alternative embodiments of the present invention (linear optimization problem with multiple iterations of partitioning a population dataset);

FIG. 6 is another flowchart for optimizing output data associated with a population based on one or more input constraints, in accordance with alternative embodiments of the present invention (linear optimization problem with a single iteration of partitioning a population dataset); and FIG. 7 is a block diagram illustrating the user's workstation of FIG. 1, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules, etc. discussed in connection with the figures. A combination of these approaches may also be used.

In general, embodiments of the present invention relate to systems, methods and computer program products for optimizing output data associated with a population based on one or more input constraints. In one embodiment, the output data is the net income before tax that is collected from selected individuals of a population who open an account at a financial institution in response to an offer communicated from the financial institution to these selected individuals to open an account at the financial institution.

In accordance with embodiments described herein, a "population" may be a set or collection of distinct objects. This set of distinct objects may be a set of people, a set of things, a set of systems, a set of values, or anything else. As used herein, an "individual" may be a person, a system, or an "entity," such as a business organization or the like.

In accordance with embodiments described herein, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

In accordance with embodiments described herein, an "account" may be the relationship that an individual or a first entity such as a business organization or the like, hereinafter referred to as the "client" or "account holder", has with a second entity, which may be a financial institution. This account may be a credit account such that the account holder has a repayment or delivery obligation towards a second entity under previously agreed upon terms and conditions.

In accordance with embodiments described herein, an "optimization problem" may refer to an optimization function, also known as an objective function, which may be constrained by one or more input constraints or parameters. In accordance with embodiments described herein, an optimization problem may also be referred to as a mathematical programming problem, or simply a programming problem.

In accordance with embodiments described herein, a programming problem or an optimization problem is linear if it comprises a linear objective function along with a linear set of constraints. If either the objective function or the set of constraints are non-linear, then the programming problem or the optimization problem is non-linear. Both a binary programming problem and an integer programming problem could either be linear or non-linear programming problems. In some embodiments, a function is linear if it satisfies the following properties:

$$f(\chi+y)=f(\chi)+f(y)_{(Additivity\ property)}$$

$$f(\alpha\chi)=\alpha f(\chi)_{(Homogeneity\ property)}$$

However, in other embodiment, a function may have to satisfy other properties as well in order to be linear.

In accordance with embodiments described herein, the term "module" with respect to a system may refer to a hardware component of the system, a software component of the system, or a component of the system that comprises both hardware and software.

Network Environment

FIG. 1 provides a block diagram illustrating a computer network environment 10 configured to optimize output data associated with a population based on one or more input constraints, in accordance with embodiments of the present invention. As illustrated in FIG. 1, the computer network environment may include a computing device such as a workstation 50 operable by a user 20 associated with an entity such as a financial institution. The workstation may be in electronic communication with a system 12 via a network 55, which may be the Internet, an intranet or the like. Additionally, the computer network environment includes the system 12 configured to optimize output data associated with a population based on one or more input constraints, allow a user of the system to define one or more input constraints via a workstation, allow a user of the system to view output data from the system via a workstation, etc.

System Environment

FIG. 2 is a block diagram of a system 12 configured to optimize output data associated with a population based on one or more input constraints, allow a user of the system to define an optimization function (or the type of output data to be optimized) and one or more input constraints, and allow a user of the system to view output data from the system, etc., in accordance with embodiments of the present invention. The system may include a computing platform 14 having a memory 17 and at least one processor 19 that is in communication with the memory 17. The memory may comprise volatile and non-volatile memory, such as read-only and/or random-access memory (RAM and ROM), EPROM, EEPROM, flash cards, or any memory common to computer platforms. Further, the memory may include one or more flash memory cells, or may be any secondary or tertiary storage device, such as magnetic media, optical media, tape, or soft or hard disk.

The processor 19 may be an application-specific integrated circuit ("ASIC"), or other chipset, processor, logic circuit, or other data processing device. The processor or other processor such as ASIC may execute an application programming interface ("API") 40 that interfaces with any resident programs, such as the optimization module 123 and related applications/routines and/or logic or the like stored in the memory of the system.

The processor may include various processing subsystems 50 embodied in hardware, firmware, software, and combinations thereof, that enable the functionality of the system and the operability of the system on a network. For example, the processing subsystems may allow for initiating and maintaining communications and exchanging data with other networked devices. The processing subsystems of the processor may include any subsystem used in conjunction with the optimization module or the like or subcomponents or submodules thereof.

The system may additionally include a communications module 60 embodied in hardware, firmware, software, and combinations thereof, that enables communications among the various components of the system, as well as between the other devices in the network. Thus, the communications module may include the requisite hardware, firmware, software and/or combinations thereof for establishing a network communication connection. It should be appreciated that the communications module may be the mechanism through which users enter input constraints or an optimization function into the system. In some embodiments, a user enters into the system the type of output data to be optimized, and the system generates an optimization function based on the user's input. It should also be appreciated that the communications module may be the mechanism through which embodiments of the present invention sends output data in the form of alerts, reports, scores, data, files, or the like to configured users, systems, and the like via postal mail, email, Short Message Service (SMS)/text, voicemail or the like. It should also be appreciated that the communications module may be the mechanism through which embodiments of the present invention initiate presentation of output data to one or more users.

The memory 17 may include an optimization module 123 that is executable by the processor. The optimization module may receive or access data regarding each object of the population that may be a collected at a remote database 120. The remote database may be a single remote database or it may represent one or more remote databases. In one embodiment, the optimization module may also receive or access optimization rules coded as logic/routines, which may be collected at a centralized rules database or at one or more remote rules databases. In one embodiment, the optimization module may also access a user's input constraints or other user input such as the type of output data to be optimized.

The optimization module may include a plurality of logic/routines configured to optimize output data associated with a population based on one or more input constraints, allow a user to define an optimization function, allow a user to enter input constraints, allow a user to view output data, and the like. The logic/routines may be implemented in one more computer programming languages. For instance, the logic/routines may be implemented in software such as PROC OPTMODEL in SAS. As a further instance, the logic/routines may also be implemented in the computer programming language 'C.' The logic/routines shown in FIG. 2 are by way of example only and, as such the optimization module may include more or less logic/routines as dictated by the implementation of the system.

The input logic/routine 106 performs or allows a user to perform some of the process blocks described in FIGS. 3-6. For instance, the input logic/routine allows a user to define or modify an optimization function, allows a user to input one or more constraints, etc.

The optimization logic/routine 104 performs some of the process blocks described in FIGS. 3-6. For instance, the optimization logic/routine performs the process of solving the optimization problem defined by the user. In one embodiment, the process of solving the optimization problem may comprise the process of converting the optimization problem from one type of problem, e.g., a non-linear BP problem, to another type of problem, e.g., a linear LP problem. The optimization logic/routine may perform other processes as well.

The selection logic/routine 105 performs some of the process blocks described in FIGS. 3-6. For instance, as described below, in some embodiments, the selection logic/routine may select individuals from a population dataset, may select individuals from a partition of a population dataset, may select partitions of the population dataset, etc. In other embodiments, the selection logic/routine may allow a user to select individuals from a population dataset, may allow a user to select individuals from a partition of a population dataset, may allow a user to select particular partition of the population dataset, etc.

The output logic/routine 107 performs some of the process blocks described in FIGS. 3-6. The output logic/routine may comprise a communication logic/routine, a presentation logic/routine, and the like. The communication logic/routine may communicate output regarding individuals selected by the system to a user or to other systems such as other communication modules. Other communication modules may use the data provided about each selected individual such as the mailing address, email address, postal address, telephone number, etc., to communicate an entity's desired message, such as an invitation to open an account. The presentation logic/routine may communicate account data regarding each selected individual to a configured user of the system, who may view the selected individual's data on a workstation associated with the user. The user may be able to understand and analyze why the particular individual was selected, how the selected individual compares to other selected individuals, or the like. The output logic/routine may also pictorially display data associated with each selected individual, such as bar graphs of potential profit per year, return on income over a five year period, etc.

Optimization Process Flow

FIG. 3 is a detailed flowchart displaying an optimization method 300, in accordance with embodiments of the present invention. FIG. 3 illustrates the flow chart in terms of "swim lanes" associated with entities which may perform the operations in each respective swim lane. The entity illustrated in the exemplary Figure is the system 12. However, it should be noted that other entities could also be involved and some embodiments of the invention may not be limited to the system illustrated in FIG. 3. Additionally, it should be understood that, in other embodiments of the invention, the system need not be required to perform the actions illustrated in each respective swim lane. Each of the process blocks in FIG. 3 may be performed by the system or by a user of the system. In some of the embodiments, a first process block presented in FIG. 3 may be performed after a second process block, even though FIG. 3 presents the first process block is performed before the second process block. For instance, block 312 may be performed before block 308, block 340 may be performed before block 336, etc.

Defining a Data Structure for Objects of a Population

The first step of the process is for a user to define a data structure associated with each object of a population dataset (block 304). In one embodiment, where each object is an individual, the data structure may be similar to that reproduced below. In another embodiment, each object may be an entity, such as a business entity or the like, rather than an individual.

| SEQ_NUM | NCR | CPP | CPP_T | PFT | GROSS_PFT | RSK |
|---------|-----|-----|-------|-----|-----------|-----|
| I | $r_i$ | $c_i$ | $e_i$ | $p_i$ | $a_i$ | $d_i$ |

Here, the SEQ_NUM (I) parameter is an identifier for an individual of the population. This identifier could include numbers, letters, symbols, or any combination thereof. In one embodiment, the SEQ_NUM(I) may comprise an individual identifier(u) coupled with an offer identifier (v). As used herein, the offer identifier is an identifier associated with a financial institution's offer to an individual to open an account at the financial institution. In one embodiment, the offer may be from some party other than the financial institution to an individual to open an account at the financial institution. This offer identifier may include numbers, letters, symbols, or any combination thereof. Therefore, I may be comprised of (u, v).

The NCR ($r_i$) parameter represents the probability of a given individual to open an account at the financial institution. As used herein, the NCR parameter may also be referred to as a probability factor. This probability is based on a predictive statistical model, i.e., a model that that assigns a probability to an individual of the population based on several metrics associated with the individual, such as financial institution data metrics which are described later with respect to the RSK parameter. The NCR parameter is a product of the probability of an individual positively responding to an offer to open an account multiplied by the probability of an underwriter associated with the financial institution determining that the individual is qualified to open the account and agreeing to open the account at the financial institution. The probability is a number between 0 and 1, both inclusive.

The CPP ($c_i$) parameter represents the cost incurred by a financial institution in communicating with a selected individual an offer to open an account at a financial institution. As used herein, the CPP parameter may also be referred to as a cost factor. In one embodiment, the communication is established via a postal mail letter or mail piece. However, in other embodiments, the offer may be communicated via email, phone, text message (e.g., Short Message Service (SMS)), in-person communication (e.g., sending a representative of the financial institution to meet an individual), or the like. This cost may be expressed as a dollar figure, e.g., $0.15. In other embodiments, the cost may comprise not just the cost for each communication with a selected individual, but also the cost involved in opening the account for the selected individual, managing the individual's account including the predicted frequency and type of transactions that will be made by the individual over a pre-determined period of time, etc.

The CPP_T ($e_i$) parameter represents the CPP parameter after deducting any applicable taxes associated with the CPP parameter.

The PFT ($p_i$) parameter represents the profit associated with the individual provided the individual successfully opens an account at the financial institution. In some embodiments, this parameter may represent the profit for a certain period of time, e.g., the predicted profit for a period of 3 years following the opening of the account. The PFT parameter is based on a predictive statistical model, i.e., a model that that assigns a probability to an individual of the population based on several metrics associated with the individual, such as financial institution data metrics, which are described later with respect to the RSK parameter.

The GROSS_PFT ($a_i$) parameter represents the previously defined PFT after deducting any applicable taxes associated with the PFT parameter.

The RSK ($d_i$) parameter is a 'risk' factor and represents how likely the individual associated with the account will not be able to meet its repayment or delivery obligation under previously agreed upon terms and conditions with the financial institution. This RSK parameter is based on a predictive statistical model, i.e., a model that that assigns a probability to an individual of the population based on several metrics (discussed in more detail below) associated with the individual, such as financial institution data metrics and/or non-financial institution data metrics. In one embodiment, the RSK parameter is a number between 0 and 1, both inclusive. In another embodiment, the RSK parameter may be a percentage. In this embodiment, the RSK parameter represents the probability that an individual will stop making payments on an account associated with a financial institution. If the predictive statistical model predicts delinquency for an individual, the RSK parameter may also consider the individual's predicted balance at the time when delinquency is predicted.

In another embodiment, the RSK parameter may be a risk score, wherein the score may be standardized on a fixed scale, such as a scale from 1 to 100. This score may also be represented as a percentage value. In another embodiment, the RSK parameter may be a risk rating, such that the risk rating is based on the risk score. For instance, a risk rating of '1' may correspond with risk scores from 70 to 100, a risk rating of '2' may correspond with risk scores from 30 to 70, and a risk rating of '3' may correspond with risk scores from 0 to 30. In one embodiment, a user may be able to change the risk score range that corresponds with a particular risk rating.

The RSK parameter may take into account various financial institution data metrics 121 and non-financial institution data metrics 122 associated with an individual of a population dataset. The financial institution data may include transactional level data, such as checking transactions, ATM transactions, and credit/debit card transactions that allow for determination of an individual's transactional behaviors. Additionally, the financial institution data may include an individual's current account data, such as account balances and the like, and an individual's other data, such as personal data, profile data, demographics data, contact information, and the like. More specifically, the individual's financial institution data may include the ages of an individual's current accounts, payment history, payment terms, payment sizes of both current and past payments, payment sources of both current and past payments, payment due dates and whether the individual is meeting the payment due dates, the number of days overdue if a payment is overdue, whether any past payments have been returned for any reason other than error on part of the financial institution that holds the account, the type of loan product associated with the individual's current account, whether the loan product is unsecured or secured, the guarantors of the account, whether any risk patterns have been previously identified for the account, whether any risk mitigation actions have previously been executed on the account, payment history of other associated accounts, any remarks associated with the account or associated accounts, etc. In addition, data may be collected from non-financial institutions, such as consumer bureaus, business bureaus, retailers (online and brick & mortar) government agencies, Internet Service Providers (ISPs), telephone companies (Telcos), health care industry entities, and the like. The information obtained from consumer bureaus may include payment status on bills, payment status on accounts at other financial institutions, credit utilization ratios, length and variety of credit history, instances of credit inquiries, instances of charge-offs, instances of bankruptcy filings, instances of other delinquencies, or the like. If an object of the population is an entity rather than an individual, information may be obtained from business bureaus. The information from business bureaus may include bankruptcy filings, payment disputes with customers, payment of dues to business bureaus, information provided to business bureaus or the like. The non-financial institution data may provide additional transactional information regarding the entity, such as the type of business or operation that the entity is engaged in, the reputation of the entity, etc. If the account holder is an individual, the non-financial information may further include the type of items purchased by the individual and the like, behavioral data regarding the individual, such as purchasing or browsing behaviors, etc. The financial institution data and non-financial institution data may be captured in one or more risk databases that allow for analytics and/or logic to be performed on the data for the purpose of generating the RSK parameter.

Defining the Optimization Problem

Now that a data structure has been established for each individual in the population, the next step is to define an optimization problem and the constraints within which the optimization problem should be solved (block 308). The goal of an optimization problem is to determine the best solution from all feasible solutions, i.e., find an optimal solution. In one embodiment, the optimization problem is defined as the following binary programming ("BP") problem:

$$(BP)\text{: } \max f(Z) = \sum_i (p_i - c_i)z_i,$$

where $z_i \in \{0, 1\}$, $1 \leq i \leq N$ where N is the size of the population dataset.

In the above BP problem, $p_i$ and $c_i$ have been described previously, while $z_i$ takes the value of either 0 (when an individual is selected) or 1 (when an individual is not selected). Since $z_i$ takes the value of 0 or 1, the above optimization problem is a binary programming problem. In one embodiment, the system assigns a value of 0 for $z_i$, i.e., the individual is not selected. In one embodiment, the system assigns a value of 1 for $z_i$, i.e., the individual is selected.

The process of selecting individuals may be controlled by a separate selection module (block 312). In deciding whether to select an individual, the selection module may consider the optimization function defined by the user, the constraints within which the optimization function is to be solved by one or more computing device processors, other parameters associated with each individual in the population dataset, etc. In some embodiments, the selection module may allow a user to select individuals.

In the above BP problem, the objective function f(Z) represents the sum of the difference between $p_i$ and $c_i$ for all individuals that are selected. This function represents the total net income before tax ("NIBT"). The above BP problem aims to maximize this sum (i.e., the net income before tax) based on one or more constraints.

This BP problem is solved by the above-described system based on the following constraints (block 308). Each constraint is worked into an inequality statement. In some embodiments, a user of the system may modify each of the following inequality statements. In one embodiment, a first constraint is:

$$\sum_i c_i z_i \leq \text{BD\_CEIL (Budget constraint)}$$

This constraint requires that the sum of the cost for each communication, e.g., a postal mailing, be less than or equal to a certain budget ceiling (BD_CEIL). In other embodiments, the cost may comprise not just the cost for each communication with a selected individual, but also the cost involved in opening the account for the selected individual, managing the individual's account including the predicted frequency and type of transactions that will be made by the individual, etc. Therefore, in such embodiments, the overall cost may be generated based on a predictive statistical model. BD_CEIL may be a single dollar value, or a continuous or discontinuous range of dollar values. In some embodiments, the system may allow a user of the system to input a value for BD_CEIL. In some embodiments, the system may also allow a user to define a function which when executed produces a value or range of values for BD_CEIL. In some embodiments, a user may decline to input a value or range of values for BD_CEIL, and in such cases the above inequality statement does not serve as a constraint. In some embodiments, the system may automatically assign a previously defined default value for BD_CEIL.

In one embodiment, another constraint based on which the above-presented binary programming problem is solved is:

$$\frac{\sum_i r_i z_i}{\sum_i z_i} \geq \text{NCR\_FLOOR (NCR constraint)}$$

The left-hand side of the above inequality statement represents the average value of NCR. This inequality statement requires the average value of NCR to be greater than or equal to a value of NCR_FLOOR. NCR_FLOOR may be a single value or a range of continuous or discontinuous values. In some embodiments, the system may allow a user of the system to input a value or range of values for NCR_FLOOR. In some embodiments, the system may also allow a user to define a function which when executed produces a value or range of values for NCR_FLOOR. In some embodiments, a user may decline to input a value for NCR_FLOOR, and in such cases the above inequality statement does not serve as a constraint. In some embodiments, the system may automatically assign a previously defined default value for NCR_FLOOR.

In one embodiment, another constraint based on which the above-presented binary programming problem is solved is:

$$\frac{\sum_i d_i r_i z_i}{\sum_i r_i z_i} \leq \text{RISK\_CEIL (Risk constraint)}$$

This numerator of the left-hand side of the inequality statement presents the sum, for all individuals in the population dataset, of RSK, i.e., $d_i$, multiplied by NCR, i.e., $r_i$ (probability that selected individual opens an account), which is, in turn, multiplied by $z_i$ (which is '1' for all selected individuals and '0' for all unselected individuals). The denominator of the left-hand side of the inequality statement presents the sum, for all individuals in the population dataset, of NCR, i.e., $r_i$ multiplied by $z_i$. The expression on the left-hand side of the inequality statement represents a weighted risk factor subject to NCR. The inequality statement requires that the expression on the left-hand side of the inequality statement be less than or equal to a value of RISK_CEIL. RISK_CEIL may be a single value or a range of values. In some embodiments, the system may allow a user of the system to input a value or range of values for RISK_CEIL. In some embodiments, the system may also allow a user to define a function which when executed produces a value or range of values for RISK_CEIL. In some embodiments, a user may decline to input a value for RISK_CEIL, and in such cases the above inequality statement does not serve as a constraint. In some embodiments, the system may automatically assign a previously defined default value for RISK_CEIL.

In one embodiment, another constraint based on which the above-presented binary programming problem is solved is:

$$\frac{\sum_i (p_i - e_i - \text{PROV\_EXP\_T} \cdot r_i) z_i}{\sum_i (e_i + \text{PROV\_EXP\_T} \cdot r_i) z_i} \geq \text{ROI\_FLOOR (ROI constraint)}$$

In this inequality, the numerator of the left-hand side of the inequality statement represents the total return (dollar value) from all the individuals that were selected. The numerator is computed by subtracting the CPP_T, i.e., $e_i$, and PROV_EXP_T.$r_i$ from PFT, i.e., $p_i$. The denominator represents the total investment (dollar value) of all individuals that were contacted. The denominator is computed by adding CPP_T, i.e., $e_i$, and PROV_EXP_T.$r_i$. PROV_EXP_T represents an estimate for a loss provision on an account after deducting any applicable taxes. The estimate may be based on losses that are statistically predicted to occur over a pre-determined period of time, such as 1 year.

The above inequality statement requires the total return on investment to be less than or equal to a value of ROI_FLOOR. ROI_FLOOR may be a single value or a continuous or discontinuous range of values. In some embodiments, the system may allow a user of the system to input a value or range of values for ROI_FLOOR. In some embodiments, the system may also allow a user to define a function which when executed produces a value for ROI_FLOOR. In some embodiments, a user may decline to input a value for ROI_FLOOR, and in such cases the above inequality statement does not serve as a constraint. This may be true in a bad economy where the goal of the financial institution is to preserve an individual's account at the financial institution. In some embodiments, the system may automatically assign a previously defined default value for ROI_FLOOR.

In one embodiment, another constraint based on which the above-presented binary programming problem is solved is the number of offers to open an account communicated to a selected individual by a financial institution.

Number of offers to each selected individual≤NUMBER_OFFERS

This inequality statement requires that each individual receive no more than a pre-determined number of offers. In one embodiment, the variable defining the number of offers may be NUMBER_OFFERS. NUMBER_OFFERS may be a single value or a range of values. In some embodiments, the system may allow a user of the system to input a value or range of values for NUMBER_OFFERS. In some embodiments, the system may also allow a user to define a function which when executed produces a value or range of values for NUMBER_OFFERS. In some embodiments, a user may decline to input a value for NUMBER_OFFERS, and in such cases the above inequality statement does not serve as a constraint. In some embodiments, the system may automatically assign a previously defined default value for NUMBER_OFFERS. For the purposes of the embodiments discussed herein, assume that NUMBER_OFFERS is '1.'

The number and type of inequality statements are not limited to those described above. In other embodiments, a user may add one or more inequality statements. In other embodiments, a user may choose to not add any inequality statements, at all. Furthermore, in some embodiments, the constraints may be expressed in the form of equations, rather than inequality statements.

Solving the Optimization Problem

In some embodiments, the system determines that the optimization problem is non-linear (block 316). If the system determines that a solver software has the ability to solve non-linear optimization problems (block 320), the above-described binary programming problem is solved, based on the above-described constraints, by one or more computing device processors and software that has the capability to solve binary programming problems (block 324). For instance where the population dataset N=15,000,000, the output may be as follows:

| BD CEIL | NCR FLR | RISK CEIL | ROI FLR. |
|---|---|---|---|
| N/A | 0 | 0.08 | N/A |

| NIBT | ROI | BD_USED | ACTS | PRFT_TOT | NCR | RSK | MAIL VOL |
|---|---|---|---|---|---|---|---|
| 2.92M | 0.149 | 3.2M | 6517 | 2.59M | 0.066% | 0.08 | 8.79M |

In this output table, the first four columns (underlined) represent a user's input into the system, i.e., the above-described constraints. Therefore, in an embodiment, a user did not enter any values for BD_CEIL, NCR_FLR (NCR_FLOOR) and ROI_FLR (ROI_FLOOR) A user entered a value of 0.08 or 8% for RISK_CEIL. The input values presented above are examples, and may not reflect actual input values.

The remaining seven columns (bold) comprise the output data that is generated based on maximizing the net income before tax produced by the above-described binary programming problem subject to the above-described constraints. The output values presented above are examples, and may not reflect actual output values.

NIBT represents the previously-described net income before tax, i.e., the dollar value produced as a result of processing, via one or more computing device processors, the above-described binary programming problem, i.e., $$\max f(Z) = \sum_i (p_i - c_i) z_i$$

subject to the above-described constraints.

ROI represents the evaluation of the previously-described return on income expression:

$$\frac{\sum_i (p_i - e_i - \mathrm{PROV\_EXP\_T} \cdot r_i) z_i}{\sum_i (e_i + \mathrm{PROV\_EXP\_T} \cdot r_i) z_i}$$

BD_USED represents the budget used in communicating with the selected individuals of the population. In other embodiments, as described previously, BD_USED may represent other costs instead of, or in addition to, the budget used in communicating with selected individuals of the population.

ACTS represents the number of accounts that were opened successfully by selected individuals.

PRFT_TOT represents the sum of the previously-described PRFT for all the selected individuals.

NCR represents the evaluation of the previously described NCR expression:

$$\frac{\sum_i r_i z_i}{\sum_i z_i}$$

RSK represents the evaluation of the previously described risk expression:

$$\frac{\sum_i d_i r_i z_i}{\sum_i r_i z_i}$$

Since the RSK output value associated with the selected individuals is less than or equal to the RISK_CEIL, the RISK_CEIL input parameter has not been violated.

MAIL VOL represents the total number of communications made to selected individuals of the population. As described previously, in some embodiments, each communication is a postal mailing.

Partitioning the Population Dataset

In one embodiment, the system may determine that the solver software does not have the capability to solve non-linear optimization problems (block 320). In one embodiment, rather than directly solving the binary programming (BP) problem, the binary programming problem is converted into a linear programming ("LP") problem. In one embodiment, the first step of converting the BP problem into an LP problem is to partition the population dataset (block 328).

The process of partitioning aims to simultaneously reduce the size of the original BP optimization problem and relax it to a continuous LP problem. By relaxing the original BP optimization problem to a continuous LP problem, each LP problem may be solved by software that has the ability to solve linear problems. The original BP problem cannot be solved by a regular LP solver. The solution to the LP problem is an approximation of the solution to the original binary programming optimization problem. The LP problem has polynomial complexity, where the number of variables in the polynomial linear programming (LP) function are equal to the number of partitions into which the population dataset is divided.

In some embodiments, the population dataset is partitioned into a plurality of smaller datasets, wherein the objects in each smaller dataset have similar attributes. The goal of partitioning the population dataset is to make each dataset as homogenous as possible. The advantage of doing so is that an average data metric for the partition may adequately represent the data metrics for each individual in the partition. For instance, in one embodiment, the individuals in a smaller dataset have similar attributes with respect to the constraints used in the optimization problem defined above. Therefore, the individuals in each smaller dataset may have similar PFT ($p_j$), NCR ($r_i$), and RSK ($d_i$) parameters. Therefore, an individual in a particular smaller dataset may have a PFT that is different from another individual's PFT in the same smaller dataset by a pre-determined maximum percentage as determined by a user of the system. Similarly, an individual in a particular smaller dataset may have a NCR or RSK that is different from another individual's NCR or RSK, respectively, in the same smaller dataset by a pre-determined maximum percentage as determined by a user of the system.

In some embodiments, the system may use a ranking procedure to gather individuals with similar attributes in the same smaller dataset. As part of such a ranking procedure, the system may order the individuals in the population dataset by PFT value in descending order. The system may then divide the individuals into a pre-determined number of partitions. For instance, the system may divide the individuals into 10 partitions or allow a user to divide the individuals into one or more partitions. For illustrative purposes, the below table shows that the first four individuals are assigned to Partition 'A' and the next four individuals are assigned to Partition 'B.' The pass(P)/fail(F) flag is set to '1' for the individuals that are selected. The pass fail/flag is set to '0' for the individuals that are not selected. In some embodiments, rather than setting P/F flags (i.e., selecting individuals when their P/F flag is '1' and not selecting individuals when their P/F flag is '0'), the system may just compute the average value for each parameter associated with all the individuals (or less than all the individuals) in a particular partition. The values presented in the table below are examples, and may not represent actual values.

| SEQ_NUM | PFT/$ | Part. | P/F Flag |
|---|---|---|---|
| 1ABDF3 | 450 | A | 1 |
| 2DFAD6 | 448 | A | 1 |
| 3GAAC7 | 442 | A | 1 |
| 4FACF9 | 439 | A | 1 |
| 5ABDC2 | 429 | B | 1 |
| 6AAFD5 | 427 | B | 1 |
| 7FECD6 | 421 | B | 1 |
| 8EAFF8 | 412 | B | 1 |

Additionally, the system may order the individuals in the population dataset by NCR value in descending order. The system may then divide the individuals into a pre-determined number of partitions or allow a user to divide the individuals into one or more partitions. For instance, the system may divide the individuals into 10 partitions. For illustrative purposes, the below table shows that the first four individuals are assigned to Partition 'C' and the next four individuals are assigned to Partition 'D.' The pass(P)/fail(F) flag is set to '1' for the individuals that are selected. The pass fail/flag is set to '0' for the individuals that are not selected. In some embodiments, rather than setting P/F flags (i.e., selecting individuals when their P/F flag is '1' and not selecting individuals when their P/F flag is '0'), the system may just compute the average value for each parameter associated with all the individuals (or less than all the individuals) in a particular partition. The values presented in the table below are examples, and may not represent actual values.

| SEQ_NUM | NCR | Part. | P/F Flag |
|---|---|---|---|
| 4EACD2 | 0.345 | C | 1 |
| 5ADFC9 | 0.342 | C | 1 |
| 3FFED2 | 0.340 | C | 1 |
| 2EDDA6 | 0.338 | C | 1 |
| 5AABB7 | 0.334 | D | 1 |
| 7CACD8 | 0.331 | D | 1 |
| 8AACC1 | 0.325 | D | 1 |
| 1FEDA0 | 0.354 | D | 1 |

Additionally, the system may order the individuals in the population dataset by RSK value in ascending order. The system may then divide the individuals into a pre-determined number of partitions or allow a user to divide the individuals into one or more partitions. For instance, the system may divide the individuals into 10 partitions. For illustrative purposes, the below table shows that the first four individuals are assigned to Partition 'E' and the next four individuals are assigned to Partition 'F.' The pass(P)/fail(F) flag is set to '1' for the individuals that are selected. The pass fail/flag is set to '0' for the individuals that are not selected. In some embodiments, rather than setting P/F flags (i.e., selecting individuals when their P/F flag is '1' and not selecting individuals when their P/F flag is '0'), the system may just compute the average value for each parameter associated with all the individuals (or less than all the individuals) in a particular partition. The values presented in the table below are examples, and may not represent actual values.

| SEQ_NUM | RSK/% | Part. | P/F Flag |
|---|---|---|---|
| 2DABF0 | 0.001 | E | 1 |
| 3AFDA1 | 0.011 | E | 1 |
| 2ABBA2 | 0.011 | E | 1 |
| 1EADC3 | 0.012 | E | 1 |
| 0CAEA4 | 0.012 | F | 1 |
| 9BBAD3 | 0.012 | F | 1 |
| 8DBAE1 | 0.013 | F | 1 |
| 7AFEF0 | 0.014 | F | 1 |

In one embodiment, the system may allow a user to specify the number of partitions for each of the above sorted lists (i.e., PFT list, NCR list, RSK list) of the population dataset. In another embodiment, the system automatically selects the number of partitions based on various parameters such as allowable processing time, allowable hardware resources to process the optimization problem, parameters associated with each object of the dataset, number and type of input constraints defined by a user, and the like. Furthermore, each partition may comprise a different number of individuals. In one embodiment, the maximum number of partitions that the population can be divided into is the number of individuals in the population. Increasing the number of partitions may increase the total amount of processing time in producing the output data when compared to an embodiment where the population dataset is divided into fewer partitions.

The total number of output scenarios, or output partitions that may be analyzed by a user, is the product of the number of partitions in the sorted PFT list multiplied by the number of partitions in the sorted NCR list multiplied by the number of partitions in the sorted NCR list. In an embodiment where each of these lists has 10 partitions, the system produces 1000 output partitions. For instance, a first output partition out of the 1000 output partitions may comprise individuals from the first partition of the sorted PFT list, individuals from the first partition of the sorted NCR list, individuals from the first partition of the sorted RSK list, etc. As a further instance, a second output partition out of the 1000 output partitions may comprise individuals from the first partition of the sorted PFT list, individuals from the first partition of the sorted NCR list, individuals from the second partition of the sorted RSK list, etc. As a further instance, the 1000$^{th}$ partition may comprise individuals from the 10$^{th}$ partition of the sorted PFT list, individuals from the 10$^{th}$ partition of the sorted NCR list, individuals from the 10$^{th}$ partition of the sorted RSK list, etc.

In some embodiments, the system may use an alternate type of ranking procedure to gather individuals with similar attributes into the same smaller dataset. For instance, the system may order the individuals in the population dataset by PFT value in descending order. Within each value of PFT, the system sorts the individuals in the population dataset by their NCR value in descending order. Within each value of NCR, the system sorts the individuals in the population dataset by their RSK value in ascending order. The system then selects a first pre-determined number of individuals for the first partition. Subsequently, the system selects a second pre-determined number of individuals for the second partition, and so on. In some embodiments, the system may allow a user to specify these first and second pre-determined numbers. In other embodiments, the system may automatically determine these pre-determined numbers based on logic/routines input into the system. An illustration of a table implementing the above-described ranking procedure is presented below. In this population dataset of 8 objects, the first four objects are assigned to Partition 'A,' and the next four objects are assigned to Partition 'B.' The pass(P)/fail(F) flag is set to '1' for the individuals that are selected. The pass fail/flag is set to '0' for the individuals that are not selected. In some embodiments, rather than setting P/F flags (i.e., selecting individuals when their P/F flag is '1' and not selecting individuals when their P/F flag is '0'), the system may just compute the average value for each parameter associated with all the individuals (or less than all the individuals) in a particular partition. The values presented below are examples, and may not represent real data. The difference between this ranking procedure and the previously described ranking procedure is that, in this ranking procedure, no individual appears in more than a single output partition or scenario. In the previously described ranking procedure, an individual may appear in the multiple output partitions/scenarios. In other embodiments, other ranking procedures may be implemented.

| SEQ_NUM | PFT/ $ | NCR | RSK/ % | Partition | P/F Flag |
|---|---|---|---|---|---|
| 1ABDF3 | 450 | 0.345 | 0.001 | A | 1 |
| 2DFAD6 | 448 | 0.342 | 0.011 | A | 1 |
| 3GAAC7 | 442 | 0.340 | 0.011 | A | 1 |

-continued

| SEQ_NUM | PFT/ $ | NCR | RSK/ % | Partition | P/F Flag |
|---|---|---|---|---|---|
| 4FACF9 | 439 | 0.338 | 0.012 | A | 1 |
| 5ABDC2 | 429 | 0.334 | 0.012 | B | 1 |
| 6AAFD5 | 427 | 0.331 | 0.012 | B | 1 |
| 7FECD6 | 421 | 0.325 | 0.013 | B | 1 |
| 8EAFF8 | 412 | 0.354 | 0.014 | B | 1 |

Defining a Data Structure Associated with Each Partition

The system may allow a user to define a partition-level data structure (block 332). The partition-level dataset has the following structure.

| Partition | NCR | CPP | CPP_T | PFT | GROSS_PFT | RSK | QTY |
|---|---|---|---|---|---|---|---|
| t | $r_t$ | $c_t$ | $e_t$ | $p_t$ | $a_t$ | $d_t$ | $q_t$ |

In the above table, 't' is an identifier for a particular partition. The values of NCR, CPP, CPP_T, PFT, GROSS_PFT, and RSK are partition-level averages of the corresponding values from the earlier table that describes the objects of the population dataset, and QTY is the number of leads, i.e., individuals or objects, in a given partition. This leads to the following approximation of the original BP problem, i.e., the BP problem is converted to a LP problem (block 336).

$$(LP): \max f(X) = \sum_t (p_t - c_t) q_t x_t,$$

subject to:

$$\sum_t c_t q_t x_t \leq \text{BD\_CEIL} \text{ (Budget constraint)}$$

$$\frac{\sum_t r_t q_t x_t}{\sum_t q_t x_t} \geq \text{NCR\_FLOOR} \text{ (NCR constraint)}$$

$$\frac{\sum_t d_t r_t q_t x_t}{\sum_t r_t q_t x_t} \leq \text{RSK\_CEIL} \text{ (Risk constraint)}$$

$$\frac{\sum_t (p_t - e_t - \text{PROV\_EXP\_T} \cdot r_t) x_t}{\sum_t (e_t + \text{PROV\_EXP\_T} \cdot r_t) x_t} \geq \text{ROI\_FLOOR} \text{ (ROI constraint)}$$

where $x_t \in [0, 1]$, t=1, ..., k, where k is the size of a partition.

The variable $z_i$ in the original optimization problem is replaced with the product $q_t x_t$, where $q_t$ is number of objects, i.e., individuals, in a given partition and $x_t$ is a continuous variable between 0 and 1. The product $q_t x_t$ represents the number of individuals that are selected from a given partition (block 340). If $x_t$ is '1' for a given partition, then the system selects all the individuals of the given partition. If $x_t$ is '0' for a given partition, then the system selects no individuals from the given partition. The selection criteria procedure that defines block 340 has been described previously.

Briefly, to summarize the previously described selection criteria, in some embodiments, the system may rank the individuals in each partition based on one or more parameters associated with the individuals and then select the first $q_t x_t$ number of individuals (or select individuals whose P/F flag is '1'). In other embodiments, in deciding which individuals to select, the system (or the selection module of the system) may consider the optimization function defined by the user (or the output data to be optimized defined by the user), the constraints within which the optimization function is to be solved by one or more computing device processors, other parameters associated with each individual in the population dataset, etc. In some embodiments, the selection module may allow a user to select a pre-determined number of individuals for each partition based on the value of the continuous variable for each partition. Also as described previously, in some embodiments, rather than setting P/F flags (i.e., selecting individuals when their P/F flag is '1' and not selecting individuals when their P/F flag is '0'), the system may just compute the average value for each parameter associated with all the individuals (or less than all the individuals) in a particular partition.

Each inequality statement that describes an input constraint is similar to the corresponding inequality statement described previously with respect to the original BP problem.

Solving the Linear Programming Problem at the Partition Level

In some embodiments where the population dataset is about 15,000,000, dividing the population dataset into approximately 1000 partitions produces a fair approximation, while not using excessive amounts of processing time. This means that the output data produced by solving the LP problem (block 344) is fairly close to the output data produced by solving the original BP problem. For instance, in some embodiments, when solving the LP problem, a solution to each of the 1000 partitions is produced in roughly 3 seconds. Therefore, the overall processing time is approximately 50 minutes. Although, the number of partitions used can be much higher at this stage, e.g., 1,000,000 partitions, the gain in accuracy of the output data may be minimal, e.g., 1-2%, while greatly increasing the processing time involved in producing the output data, e.g., 10× the amount of processing time. At this stage of the process, accuracy of the output data is not as important as producing output data in a short period of time. Therefore, in an embodiment, rather than dividing the population dataset into approximately 1,000,000 partitions, the population dataset is divided into approximately 1000 partitions. This may lead to a further reduction in the processing time to produce output data.

Subsequently, the system overlays these partitions, and rolls-up the population dataset to the partition level. As stated previously, in one embodiment, each parameter associated with a partition may be an average value for all the individuals in the partition, or one or more individuals in the partition.

Therefore, for each partition, the above-described linear programming problem is solved by one or more computing device processors based on the above-described constraints.

Therefore, the output data at the partition level may be as follows:

Each column has been described previously with respect to the embodiment where the binary programming problem is solved by not partitioning the population dataset. The NIBT, ROI, NCR, RSK output values represent the results of evaluating the left-hand side of the inequality statements listed above. BD_USED, ACTS, PRFT_TOT, MAIL VOL have been described previously with respect to the embodiment where the binary programming problem is solved by not partitioning the population dataset.

The system presents to a user this output data associated with each of the partitions (block 344). In some embodiments, the system displays this output data via a pictorial representation, e.g., bar graph for each output data value of each partition. In some embodiments, the system allows a user to compare the output data for one or more partitions, e.g., the system allows a user to compare the bar graph for the ROI value of a first partition with the bar graph for the ROI value of a second partition.

In some embodiments, a user prepares a summary of the output data for each of the partitions so that another user may easily compare the summary of the output data for one partition with the summary of the output data for another partition. In some instances, this summary includes bar graphs or other charts, pictures, and the like, for the output data as well. In some embodiments, this summary may be generated by the system.

Selection of Partitions and Determination of Selection Criteria for Individuals in Each Partition Subsequently, the system allows the user to select a pre-determined number of partitions that are attractive to the user (block 348). A user may determine that a particular partition is attractive for one or more of a number of reasons, e.g., high NIBT, high ROI, low BD_USED, high ACTS, high PFT_TOT, high NCR, low RSK, or the like. For instance, in one embodiment, a user selects 10 partitions out of the 1000 partitions that the population dataset was divided into. In one embodiment, the system automatically selects a pre-determined number of partitions based on a selection algorithm coded as a routine/logic into the system.

For each partition, as described above, the product $q_t x_t$ represents the number of individuals that are selected from a given partition. If $x_t$ is 1' for a given partition, then the system selects all the individuals of the given partition. If $x_t$ is '0' for a given partition, then the system selects no individuals from the given partition.

Therefore, for instance, in one embodiment, a partition has 100 individuals. In one embodiment, the $x_t$ for this particular partition is 0.3. This means that 30 individuals are selected from this partition. In one embodiment, the system uses an algorithm coded as a logic/routine to select 30 individuals based on one or more parameters associated with the individuals, one or more input constraints, or the like. In another embodiment, the system allows a user to select 30 individuals from the partition.

| | BD CEIL | NCR FLR | RISK CEIL | ROI FLR. | | | |
|---|---|---|---|---|---|---|---|
| | N/A | 0 | 0.08 | N/A | | | |

| NIBT | ROI | BD_USED | ACTS | PRFT_TOT | NCR | RSK | MAIL VOL |
|---|---|---|---|---|---|---|---|
| 2.88M | 0.145 | 3.0M | 6512 | 2.55M | 0.065% | 0.08 | 8.78M |

In another embodiment, the system may sort the individuals in a given partition and take the top 30% of individuals, based on a ranking scale that may be based on parameters associated with the individuals. For instance, the system computes the NIBT value for each individual in a partition and orders the individuals in the partition by NIBT value in descending order. Within each value of NIBT, the system sorts the individuals in the partition by their RSK value in ascending order. This ranking procedure is displayed in the table below. The values presented in the table below are examples, and may not represent real data. The system then selects the first 30 individuals of the sorted list. The pass/fail flag is set to '1' for the first 30 individuals since they are selected. The pass fail/flag is set to '0' for the rest of the 70 individuals since they are not selected. In other embodiments, the system may order the individuals by other ranking scales based on other parameters.

| SEQ_NUM | NIBT/$ | RSK/% | Partition | P/F Flag |
|---|---|---|---|---|
| 1ABDF3 | 470 | 0.001 | A | 1 |
| 2DFAD6 | 469 | 0.011 | A | 1 |
| 3GAAC7 | 458 | 0.011 | A | 1 |
| 4FACF9 | 456 | 0.012 | A | 1 |

In other embodiments, in deciding which individuals to select, the system (or the selection module of the system) may consider the optimization function defined by the user (or the output data to be optimized defined by the user), the constraints within which the optimization function is to be solved by one or more computing device processors, other parameters associated with each individual in the population dataset, etc. In some embodiments, the selection module may allow a user to select a pre-determined number of individuals for each partition based on the value of the continuous variable for each partition.

The selection of individuals from each partition is repeated for each of the 10 selected partitions.

Based on the optimized output data associated with these 10 partitions, a user then determines the type of individuals that may be selected (P/F Flag=1) and the type of individuals that may not be selected (P/F Flag=1) (block 352). In some embodiments, based on the output data associated with these 10 partitions, the system may automatically determine the type of individuals that may be selected and the type of individuals that may not be selected based on a pre-determined logic/routine.

For instance, the user may determine that, in order to be selected, an individual should have a minimum NIBT of $389, a maximum RSK of 0.020, etc.

Increasing Number of Partitions and Generating Output Data

Now that the user has determined the type of individuals that may be selected and the type of individuals that may not be selected, the next step is to partition the population dataset again. In one embodiment, the number of partitions is increased greatly (block 356) when compared to the number of partitions in block 328 of FIG. 3. For instance, in one embodiment, the number of partitions into which the population dataset is divided is increased to 1,000,000 partitions. Although, the system may use a much greater amount of time to solve the LP function that comprises 1,000,000 decision variables and to produce output data for a population dataset divided into 1,000,000 partitions, the accuracy of the output data is more important at this point at the process flow than the amount of processing time.

This leads to the creation of 1,000,000 decision variables that are part of the LP function that is to be solved by the LP solver, wherein each decision variable is a continuous variable between 0 and 1. The value of the continuous variable for a particular partition is based on the previously determined selection criteria that resulted from analyzing the 10 partitions. In an embodiment, a selection module may determine the value of the continuous variable for a particular partition based on the previously determined selection criteria that resulted from analyzing the 10 partitions. In some embodiments, the selection module may allow a user to select a pre-determined number of individuals for each partition based on the value of the continuous variable for each partition.

In one embodiment, the system allows the user to select the number of increased partitions. In one embodiment, the system automatically selects the number of partitions based on a pre-defined algorithm that may be based on various parameters such as allowable processing time, allowable hardware resources to process the LP problem, parameters associated with each object of the dataset, number and type of input constraints defined by a user, or the like.

The LP solver now solves the polynomial LP function with the 1,000,000 decision variables (block 360). For instance, where the population dataset N=15,000,000, the overall output after solving the linear programming problem with the increased number of partitions may be as follows:

| BD CEIL | NCR FLR | RISK CEIL | ROI FLR. | | | | |
|---|---|---|---|---|---|---|---|
| N/A | 0 | 0.08 | N/A | | | | |

| NIBT | ROI | BD_USED | ACTS | PRFT_TOT | NCR | RSK | MAIL VOL |
|---|---|---|---|---|---|---|---|
| 2.91M | 0.148 | 3.2M | 6516 | 2.58M | 0.065% | 0.08 | 8.79M |

The above table shows the results produced by solving the linear programming problem with approximately 1,000,000 partitions are close to the results produced by solving by solving the linear programming problem with fewer partitions, e.g., 1000 partitions, at block 344 of FIG. 3 (reproduced below for easy comparison). The values presented in the tables above and below are examples, and may not represent actual data.

| | BD CEIL | NCR FLR | RISK CEIL | ROI FLR. | | |
|---|---|---|---|---|---|---|
| | N/A | 0 | 0.08 | N/A | | |

| NIBT | ROI | BD_USED | ACTS | PRFT_TOT | NCR | RSK | MAIL VOL |
|---|---|---|---|---|---|---|---|
| 2.88M | 0.145 | 3.0M | 6512 | 2.55M | 0.065% | 0.08 | 8.78M |

It must be remembered that the linear programming problem defined above is only an approximate solution to the original binary programming problem, regardless of the number of partitions into which the population dataset is divided. Therefore, in some instances, it is possible that the LP solution produced by the system to the original BP problem is not feasible, i.e., the solution obtained by executing the above-described optimization problem may violate one or more of the above-described constraints defined by the user.

For instance, in an embodiment of the optimization problem where a risk ceiling of 6% is input by the user, the system may produce no individuals that meet the risk ceiling of 6%. The solution may be similar to the table below which shows the RISK_CEIL input parameter has been violated. The values presented below are examples, and may not represent real data.

| | BD CEIL | NCR FLR | RISK CEIL | ROI FLR. | | |
|---|---|---|---|---|---|---|
| | N/A | 0 | 0.06 | N/A | | |

| NIBT | ROI | BD_USED | ACTS | PRFT_TOT | NCR | RSK | MAIL VOL |
|---|---|---|---|---|---|---|---|
| 2.88M | 0.145 | 3.2M | 6512 | 2.57M | 0.065% | 0.09 | 8.78M |

In other embodiments, the system presents a solution to the linear programming (LP) problem and indicates to the user that the risk parameter has been breached by a pre-determined percentage amount. For instance the solution may be similar to the table below. As shown below, the system alerts the user to the presence of a breached parameter by changing the font associated with the output RSK parameter. The manner by which the system alerts the user is not limited to this embodiment. For instance, in other embodiments, the system may alert the user by initiating the generation of a pop-up alert at the user's workstation.

| | BD CEIL | NCR FLR | RISK CEIL | ROI FLR. | | |
|---|---|---|---|---|---|---|
| | N/A | 0 | 0.06 | N/A | | |

| NIBT | ROI | BD_USED | ACTS | PRFT_TOT | NCR | RSK | MAIL VOL |
|---|---|---|---|---|---|---|---|
| 2.88M | 0.145 | 3.2M | 6512 | 2.57M | 0.065% | 0.09**** | 8.78M |

Therefore, in embodiments where a constraint of the optimization problem has been violated, the user may have to tweak the violated parameter and re-iterate the processing of the linear programming (LP) problem in order to produce a feasible result. For instance, as shown by the table below, a user may have to tweak the risk ceiling parameter several times before a feasible solution is achieved. The values presented below are examples, and may not represent real data.

| Iteration | RSK_CEIL | RSK | NIBT |
|---|---|---|---|
| 1 | 0.06 | 0.09 | 8.78M |
| 2 | 0.07 | 0.08 | 8.72M |
| 3 | 0.08 | 0.08 | 8.68M |

The output also includes a communication file (block 364) that comprises the communication details of one or more of the individuals selected by the solution of the linear programming (LP) problem. In some embodiments where the communication details are just mailing addresses, the communication file is a mailing file and the mailing file is forwarded to a mailing company that mails account offers to the selected individuals. In some embodiments, the communication details may vary from one individual to another individual. For instance, the communication file indicates that some individuals may prefer to be contacted via email while other individuals may prefer to be contacted via mail. In such an instance, the account offer is communicated to the individual according to the individual's preference. In other embodiments, an offer may, for instance, be communicated to an individual via more than one communication option, i.e., the offer may be communicated to an individual via both SMS and postal mail. The type of communication options are not limited to those described here.

Alternate Process Flow Embodiment

Non-Linear Optimization Problem with a Single Iteration of Partitioning a Population Dataset FIG. 4 is a detailed flowchart displaying an alternative optimization method 400, in accordance with alternative embodiments of the present invention. FIG. 4 illustrates the flow chart in terms of "swim lanes" associated with entities which may perform the operations in each respective swim lane. The entity illustrated in the exemplary Figure is the system 12. However, it should be noted that other entities could also be involved and some embodiments of the invention may not be limited to the system illustrated in FIG. 4. Additionally, it should be understood that, in other embodiments of the invention, the system need not be required to perform the actions illustrated in each respective swim lane. Each of the process blocks in FIG. 4 may be performed by the system or by a user of the system. In some of the embodiments, a first process block presented in FIG. 4 may be performed after a second process block, even though FIG. 4 presents the first process block is performed before the second process block. For instance, block 312 may be performed before block 308, block 340 may be performed before block 336, etc.

In this embodiment, the process flow jumps straight from block 344 to block 364. Therefore, in this embodiment, there is only one iteration of partitioning the population dataset (block 328). Since there is only one iteration of partitioning the population dataset, the population dataset may be partitioned into a greater number of partitions, e.g., 1,000,000 partitions rather then a smaller number of partitions, e.g., 1000 partitions, for a population dataset of 15,000,000. By partitioning the population dataset into a greater number of partitions, the output results are more accurate even though the processing time for solving the converted LP optimization problem is much greater as well.

Alternate Process Flow Embodiment

Linear Optimization Problem with Multiple Iterations of Partitioning a Population Dataset FIG. 5 is a detailed flowchart displaying an alternative optimization method 400, in accordance with alternative embodiments of the present invention. FIG. 5 illustrates the flow chart in terms of "swim lanes" associated with entities which may perform the operations in each respective swim lane. The entity illustrated in the exemplary Figure is the system 12. However, it should be noted that other entities could also be involved and some embodiments of the invention may not be limited to the system illustrated in FIG. 5. Additionally, it should be understood that, in other embodiments of the invention, the system need not be required to perform the actions illustrated in each respective swim lane. Each of the process blocks in FIG. 5 may be performed by the system or by a user of the system. In some of the embodiments, a first process block presented in FIG. 5 may be performed after a second process block, even though FIG. 5 presents the first process block is performed before the second process block. For instance, block 312 may be performed before block 308, etc.

In this embodiment, the system determines that the optimization problem is a linear optimization problem at block 316 and the process flow then moves to block 328. The rest of the process flow is similar to the above-described process flow of FIG. 3, except for block 336 because the optimization problem is a linear optimization problem to begin with.

Alternate Process Flow Embodiment

Linear Optimization Problem with a Single Iteration of Partitioning a Population Dataset FIG. 6 is a detailed flowchart displaying an alternative optimization method 400, in accordance with alternative embodiments of the present invention. FIG. 6 illustrates the flow chart in terms of "swim lanes" associated with entities which may perform the operations in each respective swim lane. The entity illustrated in the exemplary Figure is the system 12. However, it should be noted that other entities could also be involved and some embodiments of the invention may not be limited to the system illustrated in FIG. 6. Additionally, it should be understood that, in other embodiments of the invention, the system need not be required to perform the actions illustrated in each respective swim lane. Each of the process blocks in FIG. 6 may be performed by the system or by a user of the system. In some of the embodiments, a first process block presented in FIG. 6 may be performed after a second process block, even though FIG. 6 presents the first process block is performed before the second process block. For instance, block 312 may be performed before block 308, etc.

This embodiment of the process flow is an adaptation of the process flow described in FIG. 5. In this embodiment, the process flow jumps straight from block 344 to block 364. Therefore, in this embodiment, there is only one iteration of partitioning the population dataset (block 328). Since there is only one iteration of partitioning the population dataset, the population dataset may be partitioned into a greater number of partitions, e.g., 1,000,000 partitions rather then a smaller number of partitions, e.g., 1000 partitions, for a population dataset of 15,000,000. By partitioning the population dataset into a greater number of partitions, the output results are more accurate even though the processing time for solving the LP optimization problem is much greater as well.

Embodiment of Workstation that Presents Output Data to User and Allows User to Enter Input Constraints and Other Input Data The workstation 50 of FIG. 1 presents an interface to the user 20. The interface allows the user to input or modify an optimization function, input or modify constraints based on which an optimization function is solved, etc. An embodiment of this workstation is presented in FIG. 7. The workstation may include various features, such as a network communication interface 1110, a processing device 1120, a user interface 1130, and a memory device 1150.

As used with respect to the workstation, a "communication interface" may generally include a modem, server, transceiver, and/or other device for communicating with other devices on a network. The network communication interface 1110 may be a communication interface having one or more communication devices configured to communicate with one or more other devices on the network 55, such as other users' computing devices, the system 12, other processing systems, data systems, etc.

As used with respect to the workstation, a "processing device" 1120 may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device may be configured to use the network communication interface to transmit and/or receive data and/or commands to and/or from the other devices connected to the network.

As used with respect to the workstation, a "user interface" 1130 may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user or output data to the user. These input and output devices may include a display, mouse, keyboard, button, touchpad, touch screen, microphone, speaker, light, joystick, switch, and/or other customer input/output device for communicating with one or more customers.

As used with respect to the workstation, a "memory device" 1150 may generally refer to a device or combination of devices that store one or more forms of computer-readable media for storing data and/or computer-executable program code/instructions. For example, in one embodiment, the memory device may include any computer memory that provides an actual or virtual space to temporarily or permanently store data and/or commands provided to the processing device when it carries out its functions described herein. In one embodiment, the memory device may include a network browsing application 1155 through which the user may access the interface on which the user may define one or more optimization functions, define one or more constraints on the optimization function, perform other selection or optimization processes, etc.

Other Environments

Thus, present embodiments disclosed in detail above provide systems, methods and computer program products for optimizing output data associated with a population based on one or more input constraints. As described in the above embodiments, the output data is the net income before tax that is collected from selected individuals of a population who open an account at a financial institution in response to an offer communicated from the financial institution to these selected individuals to open an account at the financial institution. As described above, the optimization process is subject to one or more input constraints such as a limited budget, a risk ceiling, a minimum return-on-investment value, etc.

However, the above-described system, process, and computer program product may be modified to cater to a variety of diverse environments and applications. For instance, in a computing environment where the goal is to design a search engine that produces the most relevant web-pages, the output data may the net relevance of selected web pages out of a large web pages dataset, wherein the input constraints include the search terms, the type of web pages to be searched, the processing power used in searching for web pages, the processing time used in searching for web pages, etc. As a further instance, in an engineering environment, the output data may be the net electric current produced in selected transistors of a VLSI circuit (very large scaled integrated circuit) that comprises a large set of transistors, wherein the input constraints include the characteristics and number of the power sources in the circuit, the structure of the circuit, other circuit devices, the structure of each transistor (including the type of semiconductor, method of fabrication, etc.), or the like. As an even further instance, in a chemical lab, the output data may be the net pH associated with selected product samples of a large sample dataset, wherein the input constraints include the type, concentration, and volume of the reactants, the reaction conditions, etc., that were used in producing all the product samples.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." For example, various embodiments may take the form of web-implemented computer software. Furthermore, embodiments of the present invention may take the form of a computer program product on a computer-readable medium having computer-executable program code embodied in the medium.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for optimizing output data for a population, the method comprising:
    allowing a user to define, via a computing device processor, the output data to be optimized;
    allowing a user to define, via a computing device processor, one or more input constraints based on which the output data is to be optimized;
    optimizing, via a computing device processor, subject to the input constraints, the output data for the population by:
       ordering the population based on the input constraints;
       generating a table based on the ordering step;
       partitioning, via a computing device processor, the population into a first number of partitions based on the ordering step;
       optimizing, via a computing device processor, output data for each partition by:
          selecting, via a computing device processor, an object from each partition based on a first selection routine, wherein the first selection routine determines a flag associated with the object, and wherein the flag indicates whether the object is selected; and
          generating, via a computing device processor, optimized output data for the population,
       wherein the table comprises an identifier associated with the object, a partition assigned to the object, and the flag associated with the object.

2. The method of claim 1, wherein the first selection routine comprises sorting, via a computing device processor, each partition based at least in part on one or more parameters associated with objects in each partition.

3. The method of claim 1, wherein the table further comprises a computation associated with the object, wherein the computation is based on the input constraints.

4. The method of claim 1, further comprising:
    partitioning, via a computing device processor, the population into a second number of partitions; and
    optimizing, via a computing device processor, output data for each partition by:
    selecting, via a computing device processor, an object from each partition based on a second selection routine;
    wherein the second number of partitions is greater than the first number of partitions.

5. The method of claim 4, wherein the second selection routine comprises sorting, via a computing device processor, each partition based at least in part on one or more parameters associated with objects in each partition, and based at least in part on the optimized output data for the population.

6. The method of claim 1, wherein the output data for the population is defined as a function that comprises at least one variable.

7. The method of claim 6, wherein the value of the variable is '1' for a selected object, and wherein the value of the variable is '0' for an unselected object.

8. The method of claim 1, wherein the output data for a partition is defined as a function that comprises at least one variable.

9. The method of claim 8, wherein the value of the variable is greater than '0' but less than or equal to '1' for a selected partition, and wherein the value of the variable is '0' for an unselected partition.

10. The method of claim 1, wherein the output data for the population is income collected from accounts opened by one or more selected objects.

11. The method of claim 1, wherein the population comprises at least 50,000 objects.

12. The method of claim 1, wherein the population comprises at least 10,000,000 objects.

13. The method of claim 4, further comprising:
    producing, via a computing device processor, a communication file comprising communication details for selected objects.

14. A computer program product for optimizing output data for a population, the computer program product comprising:
    a non-transitory computer-readable medium comprising a set of codes for causing a computer to:
    allow a user to define, via a computing device processor, one or more output data for optimization;
    allow a user to define, via a computing device processor, one or more input constraints based on which the output data for the population is to be optimized;

optimize, via a computing device processor, subject to the input constraints, the output data for the population by:
ordering the population based on the input constraints;
generating a table based on the ordering step;
partitioning, via a computing device processor, the population into a first number of partitions based on the ordering step;
optimizing, via a computing device processor, output data for each partition by:
selecting, via a computing device processor, an object from each partition based on a first selection routine, wherein the first selection routine determines a flag associated with the object, and wherein the flag indicates whether the object is selected; and
generate, via a computing device processor, optimized output data for the population,
wherein the table comprises an identifier associated with the object, a partition assigned to the object, and the flag associated with the object.

15. The computer program product of claim 14, wherein the first selection routine comprises sorting, via a computing device processor, each partition based at least in part on one or more parameters associated with objects in each partition.

16. The computer program product of claim 14, wherein objects in each partition are similar.

17. The computer program product of claim 14, wherein the set of codes further causes a computer to:
partition, via a computing device processor, the population into a second number of partitions; and
optimize, via a computing device processor, output data for each partition by:
selecting, via a computing device processor, an object from each partition based on a second selection routine;
wherein the second number of partitions is greater than the first number of partitions.

18. The computer program product of claim 17, wherein the second selection routine comprises sorting, via a computing device processor, each partition based at least in part on one or more parameters associated with objects in each partition, and based at least in part on the optimized output data for the population.

19. The computer program product of claim 14, wherein the set of codes further causes a computer to define the output data for the population as a function that comprises at least one variable.

20. The computer program product of claim 19, wherein the value of the variable is '1' for a selected object, and wherein the value of the variable is '0' for an unselected object.

21. The computer program product of claim 14, wherein the set of codes further causes a computer to define the output data for a partition as a function that comprises at least one variable.

22. The computer program product of claim 21, wherein the value of the variable is greater than '0' but less than or equal to '1' for a selected partition, and wherein the value of the variable is '0' for an unselected partition.

23. The computer program product of claim 14, wherein the output data for the population is income collected from accounts opened by one or more selected objects.

24. The computer program product of claim 14, wherein the population comprises at least 50,000 objects.

25. The computer program product of claim 14, wherein the population comprises at least 10,000,000 objects.

26. The computer program product of claim 17, wherein the set of codes further causes a computer to:
produce, via a computing device processor, a communication file comprising communication details for selected objects.

27. An apparatus for optimizing output data for a population, the apparatus comprising:
a computing platform including at least one computing device processor and a memory;
a module stored in the memory, executable by a computing device processor, and configured to:
allow a user to define, via a computing device processor, one or more output data for optimization;
allow a user to define, via a computing device processor, one or more input constraints based on which the output data for the population is to be optimized;
optimize, via a computing device processor, subject to the input constraints, the output data for the population by:
ordering the population based on the input constraints;
generating a table based on the ordering step;
partitioning, via a computing device processor, the population into a first number of partitions based on the ordering step;
optimizing, via a computing device processor, output data for each partition by:
selecting, via a computing device processor, an object from each partition based on a first selection routine, wherein the first selection routine determines a flag associated with the object, and wherein the flag indicates whether the object is selected; and
generate, via a computing device processor, optimized output data for the population,
wherein the table comprises an identifier associated with the object, a partition assigned to the object, and the flag associated with the object.

28. The apparatus of claim 27, wherein the first selection routine comprises sorting, via a computing device processor, each partition based at least in part on one or more parameters associated with objects in each partition.

29. The apparatus of claim 27, wherein objects in each partition are similar.

30. The apparatus of claim 27, wherein the module is further configured to:
partition, via a computing device processor, the population into a second number of partitions; and
optimize, via a computing device processor, output data for each partition by:
selecting, via a computing device processor, an object from each partition based on a second selection routine;
wherein the second number of partitions is greater than the first number of partitions.

31. The apparatus of claim 30, wherein the second selection routine comprises sorting, via a computing device processor, each partition based at least in part on one or more parameters associated with objects in each partition, and based at least in part on the optimized output data for the population.

32. The apparatus of claim 27, wherein the module is configured to define the output data for the population as a function that comprises at least one variable.

33. The apparatus of claim 32, wherein the value of the variable is '1' for a selected object, and wherein the value of the variable is '0' for an unselected object.

34. The apparatus of claim 27, wherein the module is configured to define the output data for a partition as a function that comprises at least one variable.

35. The apparatus of claim 34, wherein the value of the variable is greater than '0' but less than or equal to '1' for a selected partition, and wherein the value of the variable is '0' for an unselected partition.

36. The apparatus of claim 27, wherein the output data for the population is income collected from accounts opened by one or more selected objects.

37. The apparatus of claim 27, wherein the population comprises at least 50,000 objects.

38. The apparatus of claim 27, wherein the population comprises at least 10,000,000 objects.

39. The apparatus of claim 30, wherein the module is further configured to:
 produce, via a computing device processor, a communication file comprising communication details for selected objects.

40. A method for optimizing output data for a population, the method comprising:
 allowing a user to define, via a computing device processor, one or more output data for optimization;
 allowing a user to define, via a computing device processor, one or more input constraints based on which the output data is to be optimized; and
 optimizing, via a computing device processor, subject to the input constraints, the output data for the population by:
 ordering the population based on the input constraints;
 generating a table based on the ordering step;
 selecting an object of the population based on a selection routine, wherein the selecting step determines a flag associated with the object, and wherein the flag indicates whether the object is selected;
 wherein the population comprises at least 10,000,000 objects,
 wherein the table comprises an identifier associated with the object and the flag associated with the object.

41. A method for optimizing output data for a population, the method comprising:
 allowing a user to define, via a computing device processor, one or more output data for optimization;
 allowing a user to define, via a computing device processor, one or more input constraints based on which the output data is to be optimized; and
 optimizing, via a computing device processor, subject to the input constraints, the output data for the population by:
 ordering the population based on the input constraints;
 generating a table based on the ordering step;
 selecting an object of the population based on a selection routine, wherein the selecting step determines a flag associated with the object, and wherein the flag indicates whether the object is selected;
 wherein the input constraints comprise:
  a maximum risk factor associated with an object of the population;
  a minimum probability factor associated with an object of the population opening an account; and
  a maximum cost factor associated with communicating to an object of the population an offer to open an account,
 wherein the table comprises an identifier associated with the object and the flag associated with the object.

* * * * *